United States Patent
Lyvytsky et al.

(10) Patent No.: US 11,025,040 B2
(45) Date of Patent: Jun. 1, 2021

(54) MODULAR ELECTRICAL CONDUIT SPLIT ASSEMBLY

(71) Applicants: Vitaliy Lyvytsky, Greenfield, MA (US); Sergey Lange, Turners Falls, MA (US)

(72) Inventors: Vitaliy Lyvytsky, Greenfield, MA (US); Sergey Lange, Turners Falls, MA (US)

(*) Notice: Subject to any disclaimer, the term of this patent is extended or adjusted under 35 U.S.C. 154(b) by 0 days.

(21) Appl. No.: 16/542,765

(22) Filed: Aug. 16, 2019

(65) Prior Publication Data
US 2020/0067291 A1    Feb. 27, 2020

Related U.S. Application Data

(60) Provisional application No. 62/720,299, filed on Aug. 21, 2018.

(51) Int. Cl.
*H02G 3/04* (2006.01)

(52) U.S. Cl.
CPC ................. *H02G 3/0462* (2013.01)

(58) Field of Classification Search
USPC .......................................... 174/68.3; 138/108
See application file for complete search history.

(56) References Cited

U.S. PATENT DOCUMENTS

| | | | | |
|---|---|---|---|---|
| 2,204,737 A | * | 6/1940 | Swallow | H01B 11/1834 174/28 |
| 2,585,054 A | * | 2/1952 | Stachura | H02G 3/0481 174/36 |
| 2,933,550 A | * | 4/1960 | Cole | H01B 7/0045 174/76 |
| 3,383,456 A | * | 5/1968 | Kosak | H02G 3/0462 174/68.1 |
| 3,456,064 A | * | 7/1969 | Toto | H01R 9/11 174/15.7 |
| 3,476,869 A | * | 11/1969 | Hawkins | H02G 3/0481 174/68.3 |
| 3,747,632 A | * | 7/1973 | Kok | F16L 59/153 137/375 |
| 4,343,844 A | * | 8/1982 | Thayer | H01R 4/72 428/34.9 |
| 4,804,020 A | * | 2/1989 | Bartholomew | G02B 6/4459 138/111 |
| 4,855,532 A | * | 8/1989 | Tanabe | H01B 9/001 174/15.7 |
| 5,007,666 A | | 4/1991 | Kyfes | |

(Continued)

*Primary Examiner* — William H. Mayo, III
*Assistant Examiner* — Krystal Robinson
(74) *Attorney, Agent, or Firm* — Nixon & Vanderhye, P.C.

(57) ABSTRACT

A modular electrical conduit split assembly for efficient installation of electrical wiring. The modular electrical conduit split assembly includes an elongated, tubular conduit having at least one dividing wall running through the interior channel therein, defining separate chambers wherein each chamber includes an indicium disposed along an external surface of the conduit. A connection mechanism such as a coupling sleeve is disposed on an end of the conduit and configured to receive the end of a separate piece of conduit therein. Each chamber within the conduit is configured to receive electrical wiring therethrough which can be coordinated using color coded indicia appearing along the external surface.

20 Claims, 6 Drawing Sheets

(56) References Cited

U.S. PATENT DOCUMENTS

| | | | | |
|---|---|---|---|---|
| 5,092,375 | A * | 3/1992 | Landers | F16L 55/1003 138/103 |
| 5,132,488 | A * | 7/1992 | Tessier | H01B 7/184 174/113 AS |
| 5,227,585 | A * | 7/1993 | Zen | G02B 6/4459 138/115 |
| 5,236,016 | A * | 8/1993 | Vogelsang | H02G 3/0487 138/115 |
| 5,305,797 | A * | 4/1994 | Roy, Sr. | F16L 3/26 138/103 |
| 5,587,115 | A * | 12/1996 | Allen | G02B 6/4459 264/1.24 |
| 5,655,794 | A * | 8/1997 | Sell | F16L 39/02 285/25 |
| 6,015,952 | A * | 1/2000 | Mori | B60R 16/0222 16/2.1 |
| 6,084,180 | A | 7/2000 | DeBartolo, Jr. et al. | |
| 6,247,500 | B1 | 6/2001 | McMahon | |
| 6,311,730 | B2 * | 11/2001 | Penza | F16L 11/20 138/114 |
| 6,394,142 | B1 * | 5/2002 | Woelfel | F16L 11/22 138/115 |
| 6,604,549 | B2 * | 8/2003 | Gauthier | F16L 55/26 138/103 |
| 6,929,035 | B2 * | 8/2005 | Debaisieux | B21C 37/14 138/115 |
| 7,156,125 | B2 * | 1/2007 | Martucci | F16L 11/22 138/116 |
| 7,514,628 | B2 * | 4/2009 | Kadrnoska | F16L 3/223 174/24 |
| 7,709,739 | B2 * | 5/2010 | Ferragut | H02G 3/0633 174/74 R |
| 7,967,032 | B2 * | 6/2011 | Harada | F02B 29/0456 138/116 |
| 8,376,411 | B2 | 2/2013 | Newby | |
| 8,873,926 | B2 * | 10/2014 | Beamon | G02B 6/4248 385/136 |
| 9,245,669 | B2 * | 1/2016 | Glew | G02B 6/4434 |
| 9,396,840 | B2 * | 7/2016 | Mizutani | H02G 3/0481 |
| 2003/0236016 | A1 * | 12/2003 | Murakami | H01B 7/0081 439/212 |
| 2006/0213572 | A1 | 9/2006 | Beaulieu | |
| 2009/0120664 | A1 * | 5/2009 | Clark | H01B 11/06 174/113 R |
| 2010/0244437 | A1 * | 9/2010 | O'Neil | F16L 35/00 285/104 |
| 2011/0155458 | A1 * | 6/2011 | Kato | C07C 227/04 174/74 R |
| 2012/0037263 | A1 * | 2/2012 | Malloy | D06C 7/02 139/387 R |
| 2013/0269981 | A1 * | 10/2013 | Shiga | B60R 16/0215 174/136 |
| 2015/0020911 | A1 * | 1/2015 | Shiga | H02G 3/0481 138/108 |

* cited by examiner

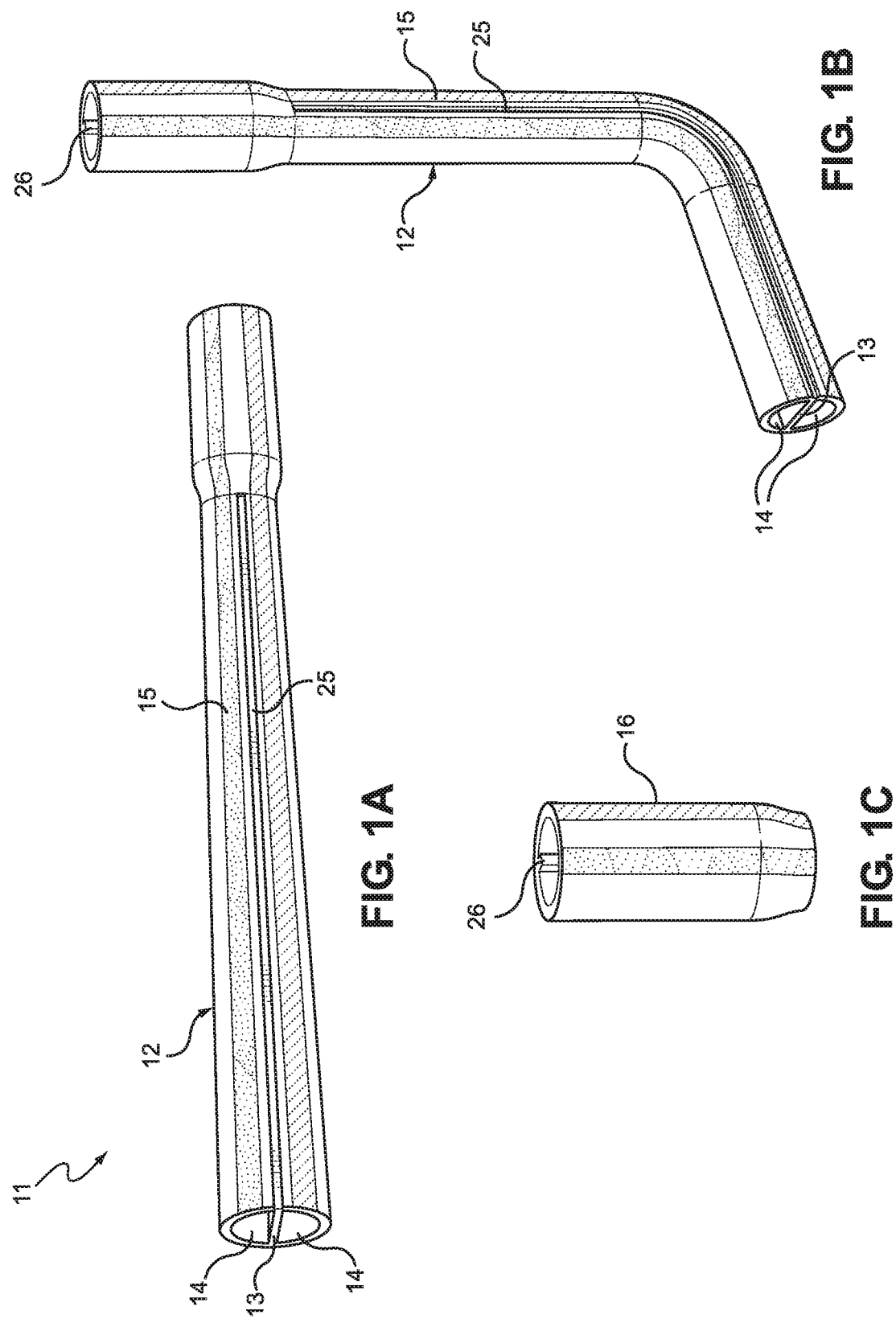

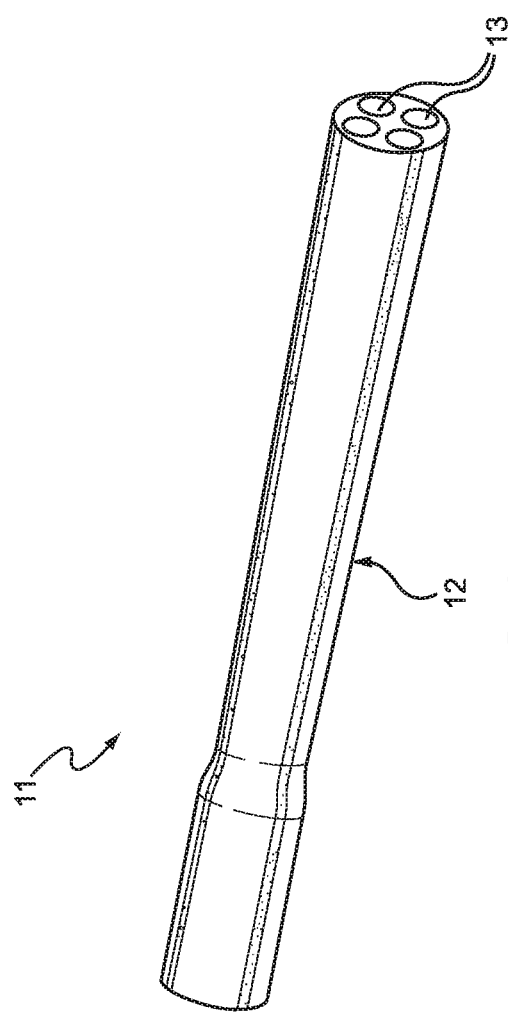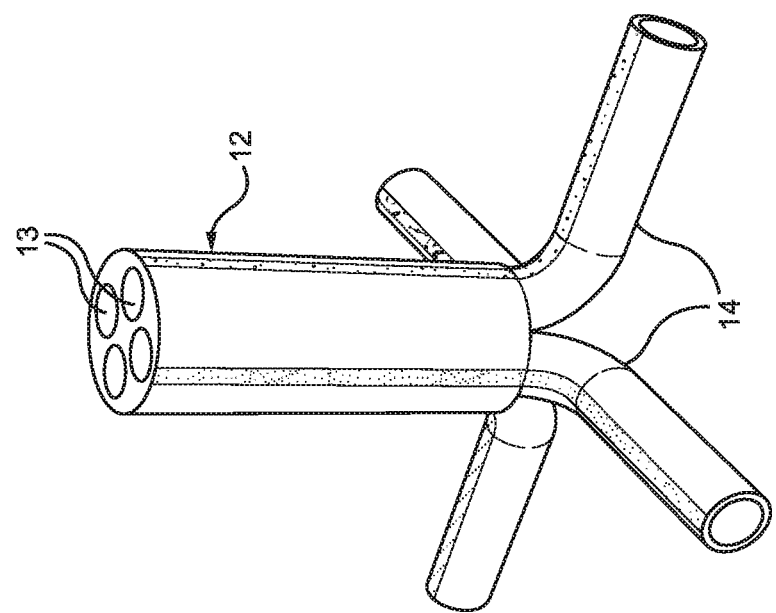

MODULAR ELECTRICAL CONDUIT SPLIT ASSEMBLY

CROSS REFERENCE TO RELATED APPLICATIONS

This application claims the benefit of U.S. Provisional Application No. 62/720,299 filed on Aug. 21, 2018. The above identified patent application is herein incorporated by reference in its entirety to provide continuity of disclosure.

BACKGROUND OF THE INVENTION

The present invention relates to multi-duct conduit assemblies. More specifically, the present invention relates to a modular electrical conduit assembly that includes a plurality of fittings each including a channel that is subdivided into at least two subchannels via one or more dividing walls extended through the length thereof.

Installing electrical wiring can be difficult and frustrating. Electricians may be working with limited space and need extra individual runs of conduit for the specific situations they are facing. More conduits typically require more fittings, thus increasing time and labor costs. Accordingly, a kit that is configured to enable installation of electrical wiring that is more efficient and effective and requires fewer fittings is desired.

In light of the devices disclosed in the known art, it is submitted that the present invention diverges in design elements from the known art and consequently it is clear that there is a need in the art for an improvement to existing modular electrical conduit assemblies. In this regard, the instant invention substantially fulfills these needs.

SUMMARY OF THE INVENTION

In view of the foregoing disadvantages inherent in the known types of multi-duct conduit assemblies now present in the known art the present invention provides a modular electrical conduit split assembly wherein the same can be utilized for providing convenience to the user when installing electrical wiring without the use of excessive amounts of individual conduits and fittings.

It is therefore an object of the present invention to provide a new and improved modular electrical conduit split assembly that has all of the advantages of the known art and none of the disadvantages. The present system comprises an elongated, tubular conduit defining a channel therethrough having at least one dividing wall within the channel creating separate chambers therein, each chamber including an indicium on the external surface of the conduit for identification and coordination purposes, and a connection member disposed on one end of the conduit configured to connect one section of the conduit to a second conduit. Some embodiments include conduits wherein the individual chambers branch off in separate directions at specific angles.

It is another object of the present invention to provide a modular electrical conduit split assembly wherein the conduit comprises a cross-sectional area and is made of a rigid synthetic polymer construction.

Another object of the present invention is to provide a modular electrical conduit split assembly wherein the indicia included on the exterior of the conduit is color coded such that one color represents a specific chamber for wiring purposes.

Yet another object of the present invention is to provide a modular electrical conduit split assembly wherein the conduit includes an angular configuration of 90-degrees from a first end to a second end.

Still another object of the present invention is to provide a modular electrical conduit split assembly wherein each chamber orthogonally separates from the main conduit portion.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1A shows a perspective view of an embodiment of the modular electrical conduit split assembly.

FIG. 1B shows a perspective view of an embodiment of the modular electrical conduit split assembly in an angled configuration.

FIG. 1C shows a perspective view of a coupling sleeve of an embodiment of the modular electrical conduit split assembly.

FIG. 3A shows a perspective view of an embodiment of the modular electrical conduit split assembly.

FIG. 3B shows a perspective view of an embodiment of the modular electrical conduit split assembly in an angled configuration.

DETAILED DESCRIPTION OF THE INVENTION

Figure 2A:
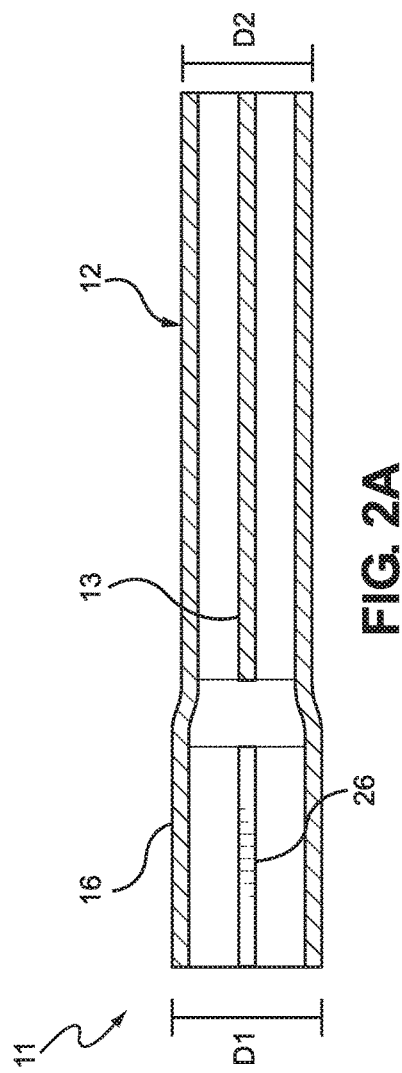
FIG. 2A shows a cross-sectional view of an embodiment of the modular electrical conduit split assembly having two internal chambers.

Reference is made herein to the attached drawings. Like reference numerals are used throughout the drawings to depict like or similar elements of the modular electrical conduit split assembly. For the purposes of presenting a brief and clear description of the present invention, an exemplary embodiment will be discussed as used for installing electrical wiring without the use of excessive amounts of individual conduits and fittings. The figures are intended for representative purposes only and should not be considered to be limiting in any respect.

Referring now to FIGS. 1A and 1B there is shown a perspective view of an embodiment of the modular electrical conduit split assembly and a perspective view of an embodiment of the modular electrical conduit split assembly in an angled configuration, respectively. The modular electrical conduit split assembly 11 comprises an elongated conduit 12 defining a channel therethrough. In the illustrated embodiment, the conduit 12 has a circular cross-sectional area but, in alternate embodiments, may comprise any suitable cross-sectional area. The conduit 12 includes at least one dividing wall 13 within the interior channel which runs a length thereof, separating the channel into distinct chambers 14. In the shown embodiment, each of the distinct chambers 14 includes an external indicium 15 along the length of the outer surface of the conduit 12 which allows a user to easily identify a specific chamber 14 within the conduit 11. In the illustrated embodiment, the external indicia 15 comprises colored tracing lines which allows a user to color code their wiring.

In some embodiments, the outer surface of the conduit 12 includes a groove 25 extending the length thereof and terminating where the conduit 12 expands to the connecting end. In these embodiments, the corresponding connecting ends include an internal notch 26 configured to align with and be inserted into the groove 25 when the conduit 12 is connected to a connecting end of another conduit 12. This provides a frictional fit and a secure connection between the conduits whereby the notch and groove 26, 25 prevent rotation of the connected components. However, other embodiments of the invention may includes smooth inner and outer conduit and connector surfaces.

In the illustrated embodiments, the conduit 12 includes a wider coupling section 16. As shown in FIG. 1C, the coupling section 16 may be a standalone component that removable secures to the conduit 12. The coupling section 16 includes a diameter at one end that is greater than a diameter at an opposing end. This allows the coupling section 16 to secure conduit 12 to a variety of other fixtures.

Figure 2B:
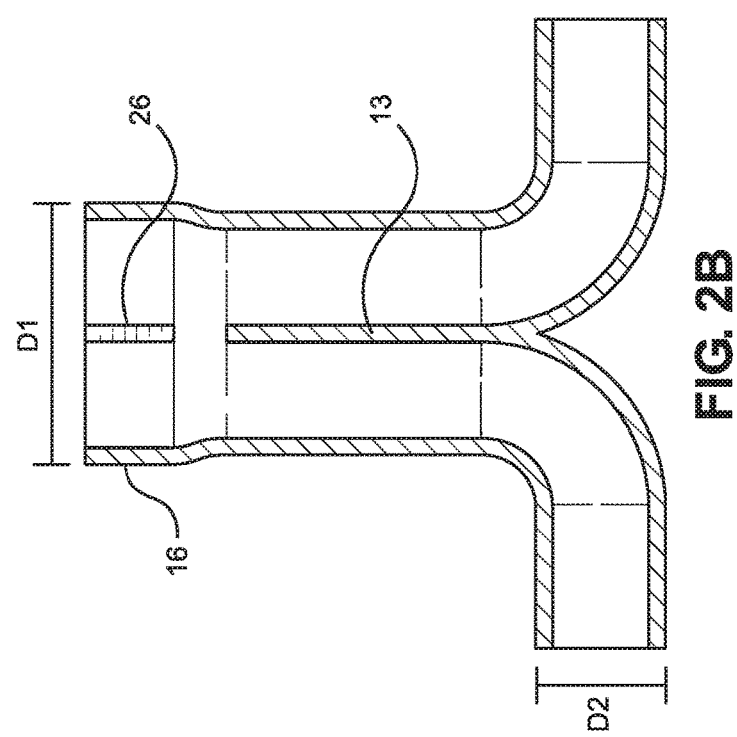
FIG. 2B shows a cross-sectional view of an embodiment of the modular electrical conduit split assembly having two internal chambers in an angled configuration.
Figure 7:
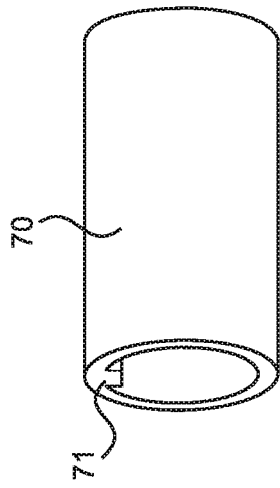
FIG. 7 shows a perspective view of a standalone embodiment of the coupling sleeve of an embodiment of the modular electrical conduit split assembly.

Referring now to FIGS. 2A and 2B, there is shown a cross-sectional view an embodiment of the modular electrical conduit split assembly and a cross-sectional view of an embodiment of the modular electrical conduit split assembly in an angled configuration, respectively. A connection mechanism 16 is included on one of the ends of the conduit 12 and is configured to attach the conduit 12 to a second conduit 12 piece. In the illustrated embodiment, the connection mechanism 16 comprises a coupling sleeve. The coupling sleeve 16 has a diameter D1 slightly larger than a diameter D2 of the rest of the conduit 11 which allows it to act as a female adapter configured to receive a separate length of conduit 11 therein. The coupling sleeve 16 does not include the dividing wall 13 which allows for a length of conduit 12 to be inserted therein and either left to be removably affixed via frictional engagement, or permanently affixed using an epoxy or adhesive within the coupling sleeve 16. While being coupled, a user may align the external indicia of the individual lengths of conduit 12 such that the dividing walls 13 align and a continuity of the chambers 14 within the interior channel is maintained. In some embodiments of the present invention, the connection mechanism 16 is removable from the system as a standalone component for connecting individual components, which is illustrated in FIG. 7, for example purposes. In this embodiment, the connection mechanism 70 may include the internal notch 71 for connection to other components of the system.

Referring now to FIGS. 3A and 3B, there is shown a perspective view of an embodiment of the modular electrical conduit split assembly having four internal chambers and a perspective view of an embodiment of the modular electrical conduit split assembly having four internal chambers in an angled configuration, respectively. The conduit 12 may include more than one dividing wall 13 within the interior channel such that a plurality of chambers 14 are created. In the illustrated figure, four dividing walls 13 within the channel form a conduit 12 having four distinct internal chambers 14 which may separately carry wiring therethrough. In some embodiments, the distinct chambers 14 may diverge from the main conduit 12 to lead into different directions for wiring purposes. This may be desired when wiring outlets at varying points from a central power connection. In the shown embodiment, the chambers 14 diverge at a 90-degree angle relative to the main conduit 12 and at 90-degree angles from the adjacent chambers 14. A conduit 12 having chambers 14 diverge in an L-configuration such as this will allow the conduit 12 to run through a wall from a power connection and branch into different rooms as needed.

Figure 4:
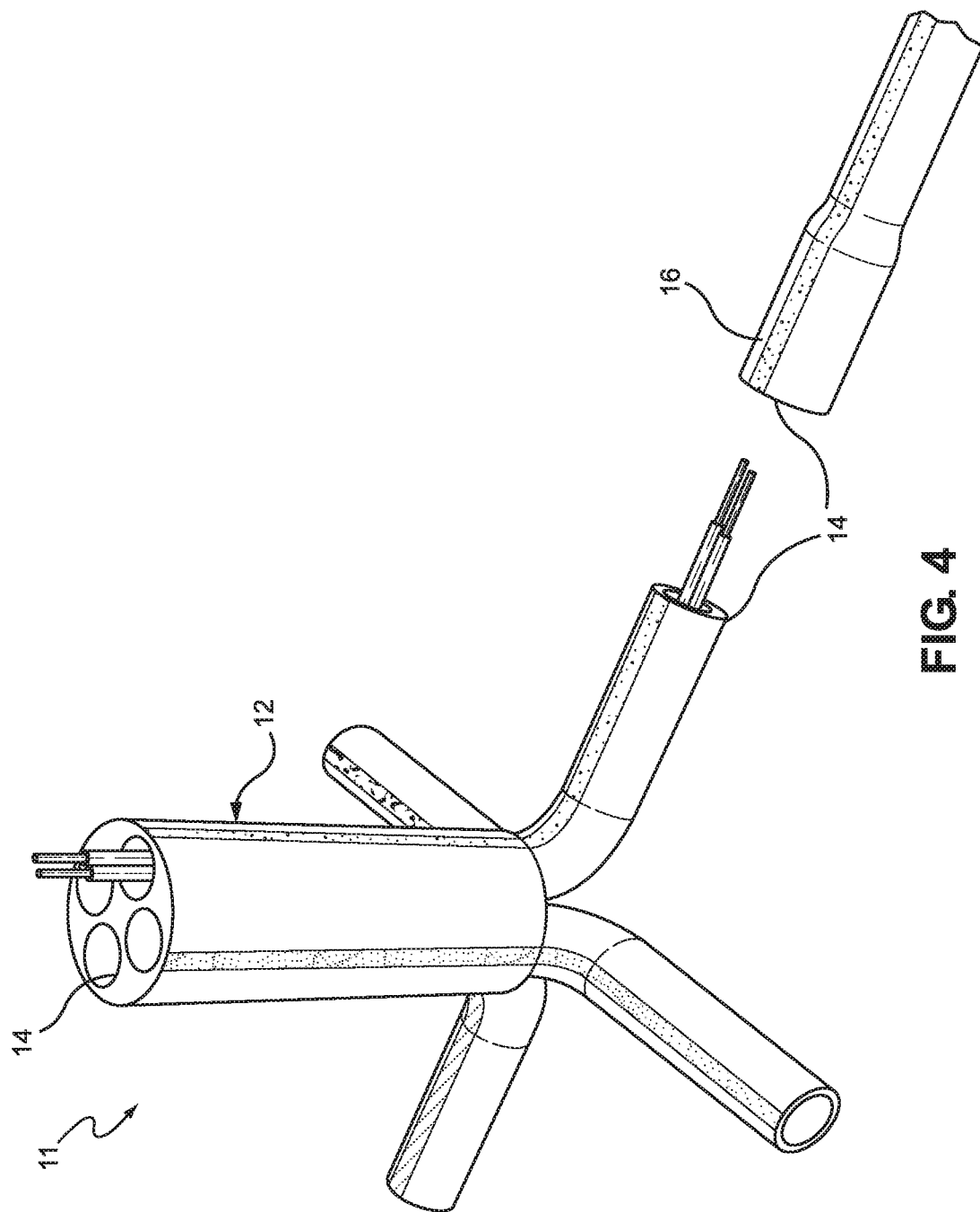
FIG. 4 shows a perspective view of an embodiment of the modular electrical conduit split assembly in use.

Referring now to FIG. 4, there is shown a perspective view of an embodiment of the modular electrical conduit split assembly in use. The modular electrical conduit split assembly 11 will ideally be sold as a kit including multiple lengths of individual conduit 12 such that the individual lengths may be connected together to form a grid structure to complete the wiring of a building or electrical grid in general. The modularity of the conduits 12 allow for different embodiments to be strung together so that that the individual needs of a user may be met using the various embodiments. A conduit 12 which includes individual chambers 14 branching off at various angles may be continued using lengths of individual chambers 14 having a coupling sleeve 16 disposed on and end thereof, as shown in the illustrated embodiment.

Figure 5:
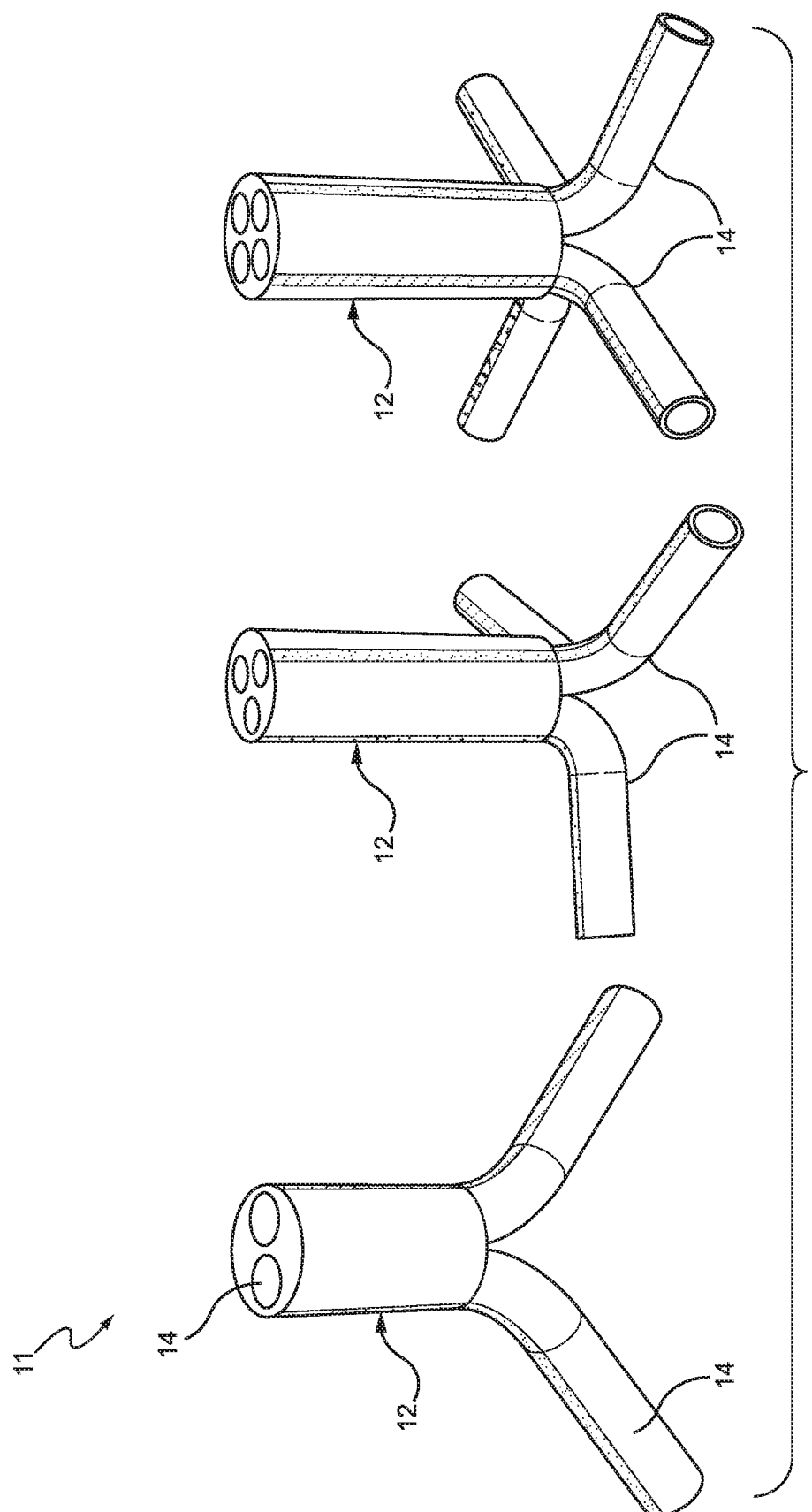
FIG. 5 shows a perspective view of several embodiments of the modular electrical conduit split assembly.

Referring now to FIG. 5 there is shown a perspective view of several embodiments of the modular electrical conduit split assembly. The conduit 12 may be made according to various configurations based on the need of the user. Individual embodiments can include conduits having two, three or four chambers 14 as shown in the illustrated embodiments. The conduit 12 can also comprise angled lengths that allow a user to change the direction of the conduit 12 or provide an offset. The individual chambers 14 may be angled relative to the main conduit 12 or the entire conduit 12 may be angled, according to need.

Figure 6A:
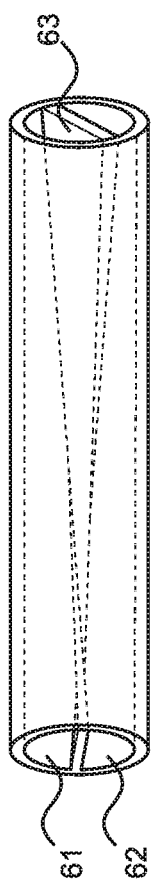
FIG. 6A shows a perspective view of an alternate embodiment of the modular electrical conduit split assembly.
Figure 6B:
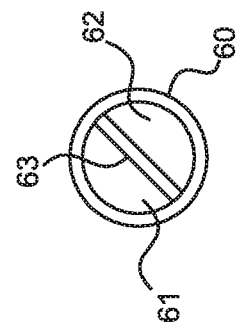
FIG. 6B shows a plan view of a first end of an alternate embodiment of the modular electrical conduit split assembly.
Figure 6C:
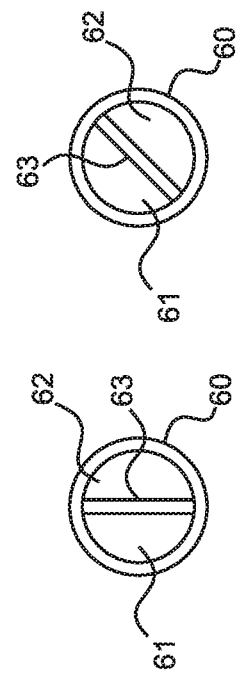
FIG. 6C shows a plan view of a second end of an alternate embodiment of the modular electrical conduit split assembly.

Referring now to FIGS. 6A-6C, there are shown multiple views of an alternate embodiment of modular electrical conduit split assembly. In some embodiments, the dividing wall that forms the internal individual chambers of the conduit twists from one end of the conduit to the other. This allows a desired angle to be achieved and will serve to keep a run of wires as straight as possible, while accommodating for uneven ground or other obstructions.

Figure 8A:
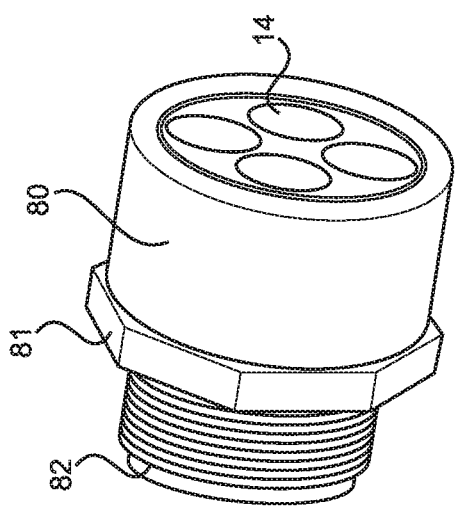
FIG. 8A shows a perspective view of a connector fitting embodiment of the modular electrical conduit split assembly.
Figure 8B:
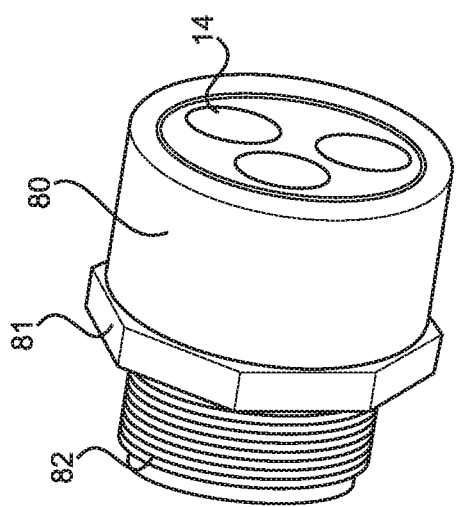
FIG. 8B shows a perspective view of an alternate connector fitting embodiment of the modular electrical conduit split assembly.

Referring now to FIGS. 8A and 8B, there are shown perspective views of a connector fitting embodiment of the modular electrical conduit split assembly. In some embodiments, the conduit split assembly includes a fitting having a conduit body 80 that includes a male threaded connector end 82 for connection to a female threaded socket. In the shown embodiments, the conduit body 80 includes a central dividing washer 81. Further, the number of split conduits 14 within the conduit body 80 can vary as desired for specific applications. In this way, the conduit body 80 can be secured to a box or other related cavities with threads and lock nuts.

The above described system can be made in a variety of materials and sizes to suit different needs. For example, the system can be composed of PVC, metal, or any other suitable durable material. Also, the inside diameter of the conduit can vary in size, and can include examples sizes of ½, ¾, 1, 1¼, 1½, 2, 2½, 3, and 4 inches in diameter. Further, the elbow portions of the conduits can include various angles to suit various purposes, such as 22.5, 45, or 90 degree angled elbows, for example. The sizes, materials, and angles can be customized to suit particular spaces and applications. In this way, the system will be compatible with existing PVC or metal products, such that the modular electrical conduit split assembly can be connected to the existing products to have unlimited means for accomplishing a given project.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A modular electrical conduit split assembly comprising:
an elongated conduit defining an interior channel therethrough having an input end and an output end;
at least one dividing wall within the interior channel of the elongated conduit running along a length thereof which subdivides the interior channel into distinct chambers wherein each of the distinct chamber defines a circular cross-sectional area and at least one of the distinct chambers is identified by an indicium disposed on an external surface of the elongated conduit corresponding to positioning of the at least one of the distinct chambers; and
a connection mechanism disposed on one end of the elongated conduit configured to secure one section of the elongated conduit to a second conduit.

2. The modular electrical conduit split assembly of claim 1, further comprising an angular conduit.

3. The modular electrical conduit split assembly of claim 2, wherein the elongated conduit includes an angle of 45-degrees relative to the ends thereon.

4. The modular electrical conduit split assembly of claim 1, wherein the elongated conduit includes an angle of 90-degrees relative to the ends thereon.

5. The modular electrical conduit split assembly of claim 1, wherein the elongated conduit defines a circular cross-sectional area.

6. The modular electrical conduit split assembly of claim 1, wherein a single dividing wall creates two separate and distinct chambers within the interior channel, each of the two separate and distinct chambers defining a circular cross-section.

7. The modular electrical conduit split assembly of claim 1, wherein three dividing walls create three separate and distinct chambers within the interior channel, each of the three separate and distinct chambers defining a circular cross-section.

8. The modular electrical conduit split assembly of claim 1, wherein the external indicium comprises a colored line running along the external surface of the elongated conduit.

9. The modular electrical conduit split assembly of claim 1, wherein each of the distinct chamber is identified by an indicia disposed on the external surface of the elongated conduit corresponding to a position of the respective distinct chamber and different colors are used for the indicia to represent each distinct chamber within the interior channel.

10. The modular electrical conduit split assembly of claim 1, wherein the connection mechanism comprises a coupling sleeve configured to receive an end of a separate length of elongated conduit therein.

11. The modular electrical conduit split assembly of claim 1, further comprising a conduit having multiple chambers wherein each chamber separates from a central conduit.

12. The modular electrical conduit split assembly of claim 11, wherein the distinct chambers separate from a central conduit at a 45-degree angle.

13. The modular electrical conduit split assembly of claim 11, wherein three distinct chambers separate from a central conduit at a 90-degree angle relative to the central conduit and at a 120-degree angle relative to each chamber.

14. The modular electrical conduit split assembly of claim 11, wherein four distinct chambers separate from a central conduit at a 90-degree angle relative to the central conduit and at a 90-degree angle relative to the adjacent chambers.

15. The modular electrical conduit split assembly of claim 1, wherein the elongated conduit is constructed of a rigid synthetic polymer.

16. The modular electrical conduit split assembly of claim 1, wherein each of the distinct chamber is identified by an indicia disposed on the external surface of the elongated conduit corresponding to a position of the respective distinct chamber.

17. The modular electrical conduit split assembly of claim 1, wherein the at least one dividing wall, within the interior channel of the elongated conduit, twists from one end of the elongated conduit to the other.

18. The modular electrical conduit split assembly of claim 1, further comprising a connector fitting comprising a conduit body including a male threaded connector on one end of the conduit body for connecting to a female threaded socket and an opposite end of the conduit body configured to connect to the elongated conduit, wherein an interior channel of the conduit body includes distinct circular cross-sectional chambers corresponding to the distinct chambers in the elongated conduit.

19. A modular electrical conduit split assembly comprising:
an elongated conduit defining an interior channel therethrough having a first end and a plurality of split conduits extending from a second end, each of the split conduits extending in a different direction from a central axis of the elongated conduit;

at least one dividing portion within the interior channel of the elongated conduit running along a length thereof which subdivides the interior channel into distinct chambers wherein each of the distinct chamber defines a circular cross-sectional area and extends to a respective split conduit of the plurality of split conduits, wherein an interior channel of each of the split conduit includes the circular cross-sectional area;

indicia disposed on an external surface of the elongated conduit and extending to external surfaces of the split conduits, wherein positioning of each of the indicia on the external surface corresponds to positioning of the distinct chambers in the interior channel and extends to one of the split conduits to which the respective distinct chamber is connected; and a connection mechanism disposed on the first end of the elongated conduit configured to secure the elongated conduit to a second conduit.

20. The modular electrical conduit split assembly of claim 1, wherein a central axis of each of the split conduits is positioned at a same angle to a central axis of the elongated conduit, and the external surface of each of the split conduits includes a circular cross-sectional area.

* * * * *